United States Patent [19]

Hanson

[11] Patent Number: 4,670,089

[45] Date of Patent: Jun. 2, 1987

[54] METHOD OF BONDING POLYTETRAFLUORO-ETHYLENE COMPOSITION TO METAL SUBSTRATES

[75] Inventor: Michael W. Hanson, Fall River, Mass.

[73] Assignee: Dixon Industries Corporation, Bristol, R.I.

[21] Appl. No.: 834,222

[22] Filed: Feb. 27, 1986

[51] Int. Cl.[4] .................. B44C 1/22; B29C 37/00; B32B 31/00
[52] U.S. Cl. .................. 156/629; 156/645; 156/668; 156/307.1; 156/308.6; 428/421
[58] Field of Search .............. 156/629, 630, 655, 645, 156/654, 668, 250, 308.6, 307.1, 307.7, 330, 335; 427/307; 428/421, 422

[56] References Cited

U.S. PATENT DOCUMENTS

| | | | |
|---|---|---|---|
| 3,067,078 | 12/1962 | Gluck | 156/629 X |
| 3,411,965 | 11/1968 | Hobaica | 156/668 X |
| 4,465,547 | 8/1984 | Belke et al. | 156/629 |

Primary Examiner—William A. Powell
Attorney, Agent, or Firm—Morgan & Finnegan

[57] ABSTRACT

A method of bonding a fluoroplastic material to a preselected surface of a metal substrate is disclosed. The method comprises: providing a flexible film, tape or sheet comprised of a fluoroplastic material which expands when heated; etching one side of the fluoroplastic film, tape or sheet; providing a flexible adhesive laminate having a surface layer comprised of a thermosetting adhesive film adhered to a non-adhesive and removable backing; treating the surface layer with a solvent to render it tacky; joining the tacky surface to the etched surface of the fluoroplastic film under pressure to form a laminate; cutting a shape from the laminate which replicates the shape of the preselected surface of the metal substrate; removing the non-adhesive backing from the laminate shape to expose the thermosetting adhesive film layer; covering the preselected surface of the metal substrate with the exposed adhesive film layer of the laminate; restraining the laminate from lateral expansion while heating the laminate to a temperature which thermosets the adhesive film and expands the fluoroplastic, for a time period sufficient to bond the fluoroplastic material to the preselected surface of the metal substrate.

8 Claims, No Drawings

METHOD OF BONDING POLYTETRAFLUORO-ETHYLENE COMPOSITION TO METAL SUBSTRATES

BACKGROUND OF THE INVENTION

1. Field of the Invention

This invention concerns a method of bonding a heat expandable fluoroplastic material to a metal substrate. More particularly, this invention concerns a method of bonding a heat-expandable fluoroplastic film under heat and pressure to a preselected surface of a metal substrate via a thermosettable solvent-activatable adhesive composition.

2. Description of Prior Art

Fluoroplastics are a class of parrafinic polymers which have some or all of the hydrogen replaced by fluorine. These materials are defined by the American Society for Testing and Materials (ASTM) as plastics based upon polymers from monomers containing one or more atoms of fluorine or copolymers of such monomers with other monomers, the fluorine-containing monomer(s) being present in the greatest amount by mass (ASTM D833). Fluoroplastics are made by free radical initiated polymerization or copolymerization of the monomers. Fluorocarbon plastics, those made from perfluoro monomers, include polytetrafluoroethylene (PTFE), fluorinated ethylene-propylene copolymer (FEP), and perfluoroalkoxy resin (PFA). Other fluoroplastics include ethylenetetrafluroethylene copolymer (ETFE), polyvinylidene fluoride (PVDF), polychlorotrifluoroethylene (PCTFE), ethylene-chlorotrifluoroethylene copolymer (ECTFE) and polyvinyl fluoride (PVF).

Fluoroplastics exhibit performance characteristics such as: resistance to harsh chemicals, a wide range of working temperatures ($-300°$ F. to $500°$ F.), outstanding electrical insulation properties, low dielectric constants and high resistivity, and very good flame resistance. Fluoroplastics also have a low co-efficient of friction giving them non-adhesive and self-lubricating surface qualities.

These non-adhesive properties are a disadvantage when it is necessary to bond fluoroplastics to other materials. In such cases, the surface of the fluoroplastic to be bonded must be treated or etched so that it can accept an adhesive. Fluoroplastics can be effectively etched with a solution of metallic sodium in anhydrous ammonia. The fluoroplastic is either dipped in the etchant solution, or, if it is not to be etched all over, etchant is applied only to the surfaces to be bonded while the other surfaces are protected from the etchant. In the case of fluoroplastic tapes or sheets, in general, only one side is etched.

Fluoroplastic tapes or sheets have been etched and bonded via an adhesive film layer to a metal substrate which itself had been treated, e.g., sand blasted. In one technique, the fluoroplastic is coated with a liquid adhesive using a brush or a spatula. Disadvantages of this technique are that: (1) it is difficult to obtain a uniform thickness of liquid adhesive; (2) the liquid adhesive tends to spread over the edges of the fluoroplastic film during the bonding step; (3) the lubricity provided by the liquid adhesive tends to result in the aligned parts sliding out of alignment during the bonding step; and (4) the liquid adhesive must be applied just prior to the bonding step, i.e., before the adhesive loses its stickiness upon extended exposure to air.

In another technique, the fluoroplastic film and an adhesive film are separately stamped or cut out into pieces having preselected shapes. With different size tools, the fluoroplastic and adhesive pieces are aligned and then are bonded together under heat and pressure. Disadvantages of this technique are that: (1) because the adhesive piece will spread or flow when it is bonded to the fluoroplastic, different size pieces must be cut out in separate steps; and (2) it is difficult to maintain alignment of the metal fluoroplastic and adhesive pieces while bonding them together by application of heat and pressure.

SUMMARY OF THE INVENTION

1. Objects of the Invention

It is an object of the invention to provide a process for bonding a fluoroplastic film or sheet to a metal substrate having only one stamping step.

An object of the present invention is to provide a simple and economical process for bonding a fluoroplastic material to a metal or plastic substrate.

2. Brief Description of the Invention

According to the present invention, a process for bonding a fluoroplastic material, in the form of a tape, film or sheet, to a preselected surface of a metal substrate is provided The method comprises:

providing a flexible film, tape or sheet comprised of a fluoroplastic material which expands when heated, e.g., when heated to a temperature above about $190°$ C.;

etching one side of the fluoroplastic film, tape or sheet;

providing a flexible adhesive laminate having a surface layer comprised of a thermosetting adhesive film adhered to a non-adhesive and removable backing;

treating the adhesive film surface layer with a solvent to render it tacky;

joining the tacky surface to the etched surface of the fluoroplastic film, tape or sheet under pressure to form a laminate;

cutting a shape from the laminate which replicates the shape of the preselected surface of the metal substrate;

removing the non-adhesive backing from the laminate shape to expose the thermosetting adhesive film layer;

covering the preselected surface of the metal substrate with the exposed adhesive layer of the laminate;

restraining the laminate from lateral expansion while heating the laminate to a temperature which thermosets the adhesive film and expands the fluoroplastic for a time period sufficient to bond the fluoroplastic material to the preselected surface of the metal substrate.

Other objects, aspects and advantages of the present invention will be pointed out in, or will be understood from the following detailed description provided below.

3. Detailed Description of the Invention

According to the method of this invention, there is employed a flexible film, tape or sheet comprised of a fluoroplastic material which expands when heated, e.g., when heated to a temperature above about $190°$ C. Fluoroplastics, in general, expand when their temperature is raised and contract when their temperature is lowered. For example, when a filled polytetrafluoroethylene film, such as Rulon ® film, is heated from room temperature to about 190° C., it expands about 0.028 inches per inch.

Suitable fluoroplastics include polytetrafluoroethylene (PTFE); or PTFE containing a wear-resistant filler such as polyimide, glass fibers, bronze, carbon, graphite or the like. Particularly preferred is a virgin PTFE or the PTFE disclosed in U.S. Pat. No. 3,652,409. Other suitable fluoroplastics include a perfluoroalkoxy resin having the following repeating units:

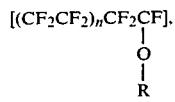

wherein R is $C_nF_{2n+1}$ and n is an integer $\geq 1$; a fluorinated ethylehe propylene copolymer (FEP) having the following repeating units:

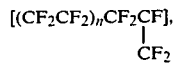

wherein n is an integer $\geq 1$ (melting point of about 310° C.); ethylene-chlorotrifluoroethylene copolymer (ECTFE) (melting point of about 245° C. and a density of 1.68 g/cc which is predominantly 1:1 alternating copolymer product of copolymerizing ethylene and chlorotrifluoroethylene and consisting of linear chains with the predominate repeating units:

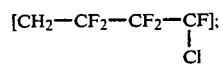

ethylene-tetrafluoroethylene copolymer (melting point of about 270° C. and a density of 1.7 g/cc) which is predominantly 1:1 alternating copolymer of ethylene and tetrafluoroethylene and consisting of linear chains with the repeating unit $CH_2$-$CH_2$-$CF_2$-$CF_2$; and polyvinylidene fluoride (melting point of 170° C. and a density of 1.78 g/cc).

PTFE and PTFE containing one or more wear-resistant fillers are preferred materials because of their low frictional properties, their memory, their chemical inertness and their thermal properties.

One side of the fluoroplastic material is etched to render it receptive to an adhesive film. Suitable etchants which may be utilized in the practice of this invention include a solution of metallic sodium in anhydrous ammonia, naphthalyene, or any other liquid system, which dissolves metallic sodium without the presence of water and the like. However, it is understood that any known etchant for fluoroplastics may be employed, including ion bombardment.

A flexible adhesive laminate is provided. The laminate has a surface layer which is comprised of a thermosettable adhesive film adhered to a non-adhesive and removable backing. Suitable thermosetting adhesives include a thermosetting resin and a curing agent for the resin. Examples of suitable thermosetting resins are epoxy resins, phenolic resins and the like. Suitable curing agents for the resins are well known to those skilled in the art. Other suitable adhesives are believed to include those described in U.S. Pat. Nos. 4,251,427 to Recker et al. and 4,507,456 to Blum et al., the disclosures of which are incorporated herein by reference.

The adhesive film is adhered to a non-adhesive and removable backing sheet. Suitable materials for the backing sheet include, for example, a suitable plastic material or a silicone coated paper.

The adhesive film surface is softened and rendered tacky by exposure to a suitable solvent such as methyl ethyl ketone, acetone, methyl n-propyl ketone, diethyl ketone, hexanone-2, hexanone-3, methyl t-butyl ketone, di-n-propyl ketone, diisopropyl ketone, diisobutyl ketone, di-n-amyl ketone, stearone, chloroacetone, s-dichloroacetone, diacetyl, acetylacetone, mesityl oxide, phorone, cyclohexanone, benzophenone and the like.

The etched surface of the fluoroplastic material then is pressed against the tacky adhesive surface using a pressure sufficient to adhere the two parts together, e.g., above about 50 psi pressure.

A shape is cut or stamped out of the laminate which replicates the shape of a preselected surface of a metal substrate to which the fluoroplastic material is to be bonded. The metal substrate may be, for example, a shock absorber piston which is a sintered metal component resembling a small wheel. The pistons vary in size, but typically are about 1¼ inches in diameter and about ¾ inches thick. The fluoroplastic material provides a seal on the external surface of the piston ring and provides the lubricity needed for the piston to work in a cylinder.

The backing sheet is removed from the stamped or cut piece and the cut piece is wrapped around or inserted into the shock absorber part with the adhesive surface in contact with the metal surface to which it is to be bonded. Then, the composite is either inserted into a tube or onto a mandrel, depending upon whether the bonding is internal or external. The fit is a light interference one. After mounting, the tube or mandrel is heated to a temperature sufficient to thermoset the adhesive, e.g., above about 190° C. The heating expands the fluoroplastic compound which is restrained by the outer tube or inner mandrel. Thus, the expansion of the fluoroplastic material is permitted only in the direction of the bond. This action facilitates a strong bond between the fluoroplastic material and the metal substrate to which it is bonded.

The final bonded assembly may then be subjected to a swagging type operation to polish and size the final part.

By this method, multiple stamping steps are reduced to one. Assembly is simplified; there are only two parts to put together instead of three parts. Finished parts trimming is minimized. Inventorying of parts ready to be assembled is simplified. These and other objects and advantages of this invention are apparent to those skilled in the art from the description herein.

It will be apparent to those skilled in the art that various changes, modifications and uses of the present invention are possible without departing from the spirit of the invention of the scope of the appended claims in light of the above teachings.

What is claimed is:

1. A method of bonding a fluoroplastic material to a surface of a metal substrate which comprises:
   providing a flexible film, tape or sheet comprised of a fluoroplastic material;
   etching one side of the fluoroplastic film, tape or sheet;
   providing a flexible adhesive laminate having a surface layer comprised of a thermosetting adhesive film adhered to a non-adhesive and removable backing;

treating the adhesive film surface layer with a solvent to render it tacky;

joining the tacky surface to the etched surface of the fluoroplastic film, tape or sheet under pressure to form a laminate;

cutting a shape from the laminate which replicates the shape of the preselected surface of the metal substrate; removing the non-adhesive backing from the laminate shape to expose the thermosetting adhesive film layer;

covering the preselected surface of the metal substrate with the exposed adhesive layer of the laminate;

restraining the laminate from lateral expansion while heating the laminate to a temperature which thermosets the adhesive film and expands the fluoroplastic for a time period sufficient to bond the fluoroplastic material to the preselected surface of the metal substrate.

2. The method of claim 1 where said fluoroplastic is selected from the group consisting of polytetrafluoroethylene and polytetrafluoroethylene containing a wear-resistant filler.

3. The method of claim 1 wherein said fluoroplastic is selected from the group consisting of a perfluoroalkyl resin having the following repeating units:

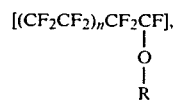

where R is $C_nF_{2n+1}$ and n is an integer $\geq 1$; a fluorinated ethylene propylene copolymer having the following repeating units: $[CF_2CF_2)_n CF_2CF]$, wherein $CF_3$ n is an integer $\geq 1$; ethylene-chlorotrifluoroethylene copolymer; ethylene-tetrafluoroethylene copolymer; and polyvinylidene fluoride.

4. The method of claim 1 wherein the thermosetting adhesive comprises a thermosetting resin and a curing agent for the resin.

5. The method of claim 1 wherein the backing comprises a silicone paper.

6. The method of claim 1 wherein said adhesive film surface is softened and rendered tacky by exposure to a solvent selected from the group consisting of methyl ethyl ketone, acetone, methyl n-propyl ketone, diethyl ketone, hexanone-2, hexanone-3, methyl t-butyl ketone, di-n-propyl ketone, diisopropyl ketone, diisobutyl ketone, di-n-amyl ketone, stearone, choroacetone, s-dichloroacetone, diacetyl, acetylacetone, mesityl oxide, phorone, cyclohexanone and benzophenone.

7. The method of claim 1 wherein said tacky adhesive surface is joined to the etched surface of the fluoroplastic film under a pressure of about 50 psi.

8. The method of claim 1 wherein said temperature which thermosets the adhesive film and expands the fluoroplastic is above about 190° C.

* * * * *